May 3, 1949.    F. E. MECHLING    2,469,307
SELF-SEALING INNER TUBE DEMONSTRATION TOOL
Filed March 26, 1948
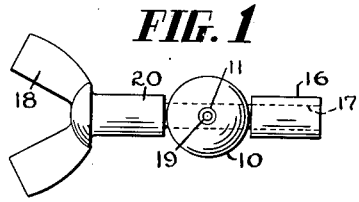
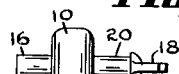
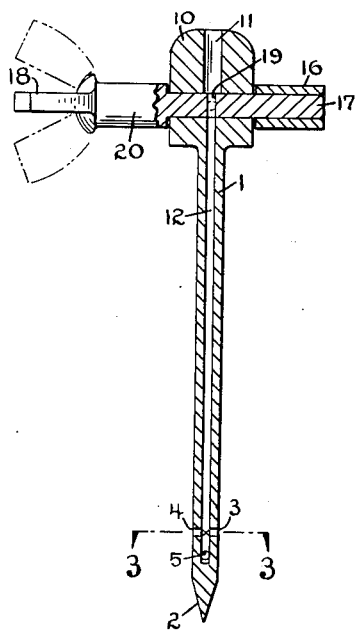
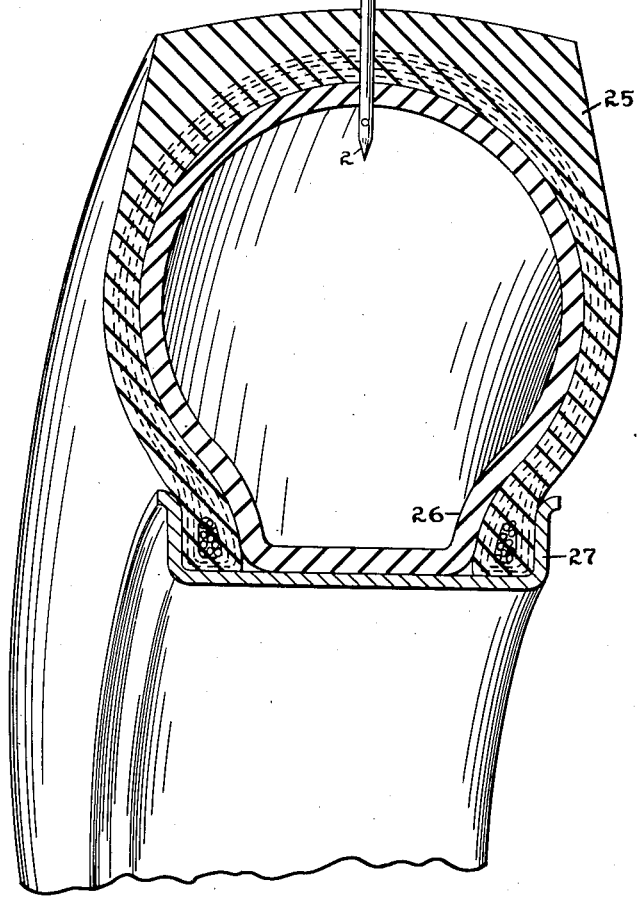
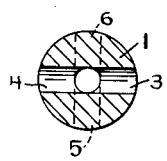
INVENTOR
FREDERICK E. MECHLING
BY
Gordon C. Mark
Attorney Patented May 3, 1949

2,469,307

UNITED STATES PATENT OFFICE 2,469,307

SELF-SEALING INNER TUBE DEMONSTRATION TOOL

Frederick E. Mechling, Akron, Ohio, assignor to Seiberling Rubber Company, Barberton, Ohio, a corporation of Delaware Application March 26, 1948, Serial No. 17,219

1 Claim. (Cl. 35—49)

This invention relates to a tool for demonstrating the self-sealing properties of an inflated tire mounted on a rim, or of an inner tube inflated inside of a tire mounted on a rim and ready for use.

The tire or tube may be of any self-sealing construction. It may be a tube of the type now on the market in which gum rubber is used to seal a puncture, and which is advertised for use by law enforcement agencies because it is not deflated by bullets or the like. It may be a self-sealing tire of the type recently announced. The tool has nothing to do with the structure of the tube or tire and may be used with any tube or tire which is of self-sealing construction.

The tool comprises a metal shaft which is pointed at one end and thus adapted to be driven into a tire. The shaft is hollow throughout substantially its whole length. The hollow center stops short of the point of the shaft and there are one or more perforations just above the point which connect with it. There are also one or more perforations at the other end of the shaft connecting with the hollow center. Between the perforations there is a valve.

The tool is of rugged construction and the point of the shaft is sharp and adapted to be driven through a tire, whether or not the tire contains an inner tube. The tool, with the valve closed, is driven into the inflated tire or into the tube inflated in a tire. The valve is then opened to show by the escape of air that the tire or tube has been punctured. Then with the valve open or after closing it, the tool is removed from the tire, and the tire or tube is shown to be self-sealing by the fact that the sound of escaping air ceases and the tire does not deflate.

The invention will be further described in connection with the accompanying drawings which illustrate the use of the tool in a self-sealing inner tube inflated in a tire.

Fig. 1 is a top view of the tool;

Fig. 2 is a side view partly in section of the tool, showing the valve in two positions;

Fig. 3 is a section on the line 3—3 of Fig. 2; and

Fig. 4 is a section through a tire and tube showing the tool inserted therein.

The tool comprises the hollow shaft 1, which is pointed at the end 2. There are four openings 3, 4, 5 and 6 in the shaft just above the point, connecting with the hollow center. These openings are preferably not on the same level because this would weaken the shaft unduly.

There is an enlargment or head 10 at the opposite end of the shaft which may be struck with a hammer or like instrument to drive the point through a tire or tube. The head has a hollow center 11 which connects with the hollow 12 of the lower portion of the shaft.

The collar 16 is welded to the stem 17 of the valve to hold the valve in place. The opposite end of the stem is provided with the wings 18 to facilitate turning the valve. The opening 19 through the valve may be turned horizontally to close the tool or vertically to open it.

Figs. 1 and 2 show the wings 18 in the horizontal position and the bore 19 in the vertical position. Fig. 2 also shows in dotted lines the wings 18 in the vertical position and the bore 19 in the horizontal position. The wings 18 are fastened to the enlarged portion 20 of the valve which spaces the wings from the head 10.

As illustrated in Fig. 4, when the tool is used for demonstration purposes it is driven through the tire 25 and inner tube 26 which are mounted on the rim 27. A hammer or the like is used for this purpose. The tube 26 is of a self-sealing type. It is inflated to the ordinary pressure. The valve is closed when the tool is driven into the tire and tube. Then the valve is opened by turning the wings 18 to the horizontal position shown in Fig. 4. This permits air entering the holes near the point of the shaft to escape through the opening 11. The person for whom the demonstration is being made can easily detect the escape of air through this opening. Then preferably without closing the valve, the first and second fingers of the right hand are looped under the collar 16 and enlargement 20 of the valve stem respectively, and by pulling, the tool is removed from the tire and tube. The escape of air stops immediately. This demonstrates that the tube has sealed itself.

The tool is similarly employed to demonstrate the self-sealing properties of a tire.

The description of the demonstration is illustrative. Modifications may be made without departing from the invention. The details of the tool as shown are likewise illustrative. The invention is defined in the claim which follows:

What I claim is:

A tool for demonstrating the self-sealing properties of an inner tube inflated inside of a tire, which includes a rigid metal shaft which is hollow throughout most of its length and pointed at its inner end, an enlargement at the outer end of the shaft to serve as a head for driving the tool into a tire, a valve the stem of which passes through the head, the portions of the valve on both sides of the head being larger in diameter than the stem to facilitate manual removal of the tool from a tire, an opening through the valve stem, the hollow of the shaft connecting at the inner end of the shaft with holes located on different longitudinal surfaces of the shaft near the point and at different distances from the point, the hollow connecting at the other end with one end of the hole in the valve stem when the valve is in one position, and a hole in the head which with the valve in that position connects the other end of the hole in the stem with an opening in the surface of the head.

FREDERICK E. MECHLING.

REFERENCES CITED

The following references are of record in the file of this patent:

UNITED STATES PATENTS

| Number | Name | Date |
|---|---|---|
| 563,621 | Schimmel | July 7, 1896 |
| 1,124,285 | Brown | Jan. 12, 1915 |